United States Patent
Singleton

(10) Patent No.: US 6,551,544 B1
(45) Date of Patent: Apr. 22, 2003

(54) SHUTTLE BLOW MOLDING METHOD AND APPARATUS

(75) Inventor: Daryl K. Singleton, Chelsea, MI (US)

(73) Assignee: Owens-Brockway Plastic Products Inc., Toledo, OH (US)

( * ) Notice: Subject to any disclaimer, the term of this patent is extended or adjusted under 35 U.S.C. 154(b) by 4 days.

(21) Appl. No.: 09/836,483

(22) Filed: Apr. 17, 2001

(51) Int. Cl.$^7$ .......................... B29C 49/50; B29C 49/76
(52) U.S. Cl. .................. 264/536; 425/525; 425/527; 425/537
(58) Field of Search .................. 425/525, 527, 425/537; 264/536

(56) References Cited

U.S. PATENT DOCUMENTS

| | | | |
|---|---|---|---|
| 3,003,187 A | * 10/1961 | Schaich | 425/527 |
| 3,846,531 A | * 11/1974 | Reilly | 264/536 |
| 3,989,786 A | 11/1976 | Mehnert et al. | 425/806 |
| 4,116,607 A | * 9/1978 | LeGrand | 425/525 |
| 4,126,658 A | * 11/1978 | Rupert et al. | 425/527 |
| 4,390,338 A | 6/1983 | Bowers et al. | 425/525 |
| 4,497,623 A | 2/1985 | Beuscher | 425/525 |

* cited by examiner

Primary Examiner—Robert Davis

(57) ABSTRACT

Extrusion blow molding apparatus (10) having a body mold (12) for forming a body portion (B) of a blow molded container (C) from a blowable, extruded thermoplastic parison (P). The blow molding apparatus also has a neck mold (14) for forming an annular finish portion (15) of the container from the parison, the neck mold being removable from the body mold at the conclusion of the blowing step. A blow pin (16), which is reciprocable relative to the body mold, introduces blowing air into the parison during the blowing cycle, and an outside diameter of the blow pin provides a surface against which an internal diameter of the finish is formed. The process also forms a moil portion (M) that extends upwardly and outwardly from a rim (R) at the top of the finish portion of the container, and an anvil (18) with a moil retention element (18a) with an inwardly projecting flange (18b) is provided in contact with an exterior of the neck mold.

3 Claims, 4 Drawing Sheets

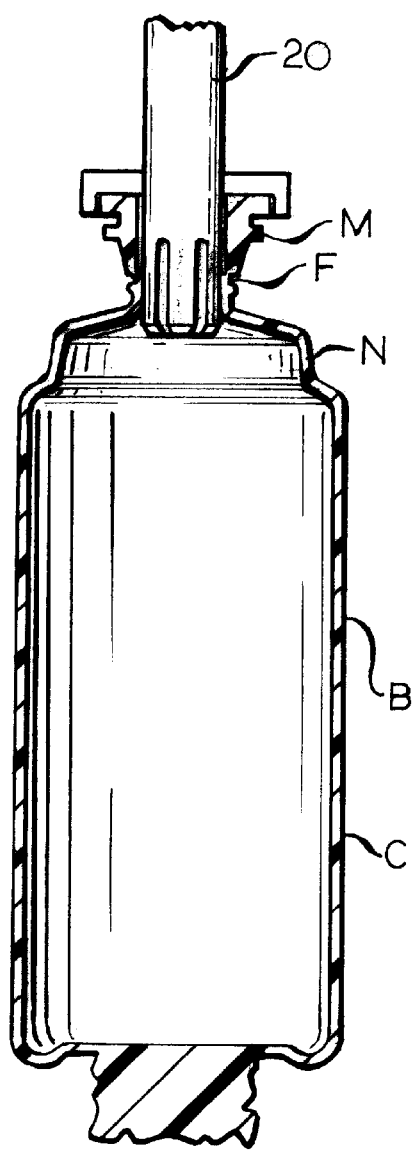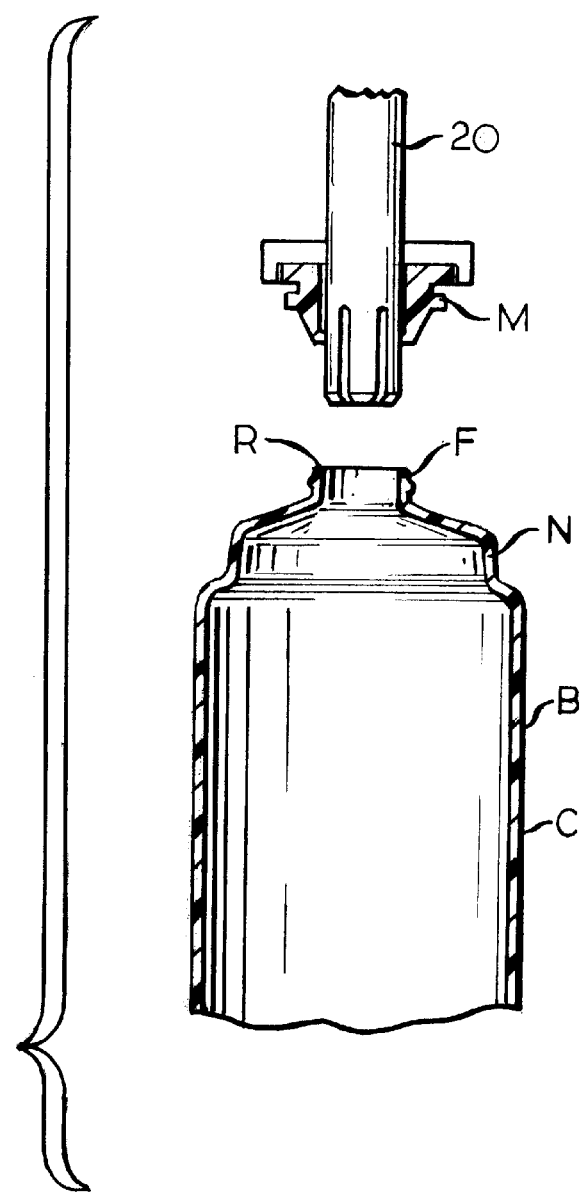
FIG. 4
FIG. 5

SHUTTLE BLOW MOLDING METHOD AND APPARATUS

BACKGROUND OF THE INVENTION

1. Field of the Invention

This invention relates to an improved apparatus and method of the shuttle blow molding type, which is also referred to as the extrusion blow molding type, for producing thermoplastic containers. More particularly, this invention relates to an improved apparatus and method of the foregoing character for removing the moil portion of a thermoplastic container during its production by shuttle blow molding or extrusion blow molding.

2. Description of the Prior Art

In the production of thermoplastic containers by extrusion blow molding, a blow pin is reciprocated relative to a blow mold to inject blowing air into the container being formed in the blow mold from an extruded tubular parison of thermoplastic material that is at an elevated temperature. Blowing air is introduced into the parison through the blow pin when the free end of the blow pin is positioned within the parison, and the blow pin is thereafter removed from the blow mold to permit the blown container therein to be removed from the mold.

The molding equipment used in producing a plastic container by shuttle blow molding includes a body mold in which the body portion of the container is formed by blowing and a finish portion of the container is blown in a separate annular neck mold that is positioned at an open end of the body mold. The body mold and the neck mold are each made up of a separable pair of mold halves, and are normally opened and closed in unison, though the neck mold may be separately removed from the body mold, for example, to replace it with a different neck mold if required to produce a container with a finish that is different in size or type. Before removal of the blown container from the molding equipment, the halves of the body mold and the neck mold are separated, and takeout tooling is inserted into the finish of the blown container to remove the blown container from the molding equipment. In the production of blown plastic containers according to the shuttle blow molding process, an axially and radially outwardly projecting annular scrap portion, which is usually referred to a moil, is formed at the rim of the container, and this moil must be severed from the container and then appropriately discarded before the container is ready for shipment to a packing plant. The severing of the moil is usually done by a cutter portion of the blow pin that compresses the moil in a thin annular pattern against an anvil portion of the neck mold. However, the severing and the appropriate discarding of the moils from shuttle blow molded thermoplastic containers heretofore was difficult to control because the tendency of the moils to adhere to the blow pin and to disengage from the container in an uncontrolled manner as the blow pin was extracted from the molding equipment.

SUMMARY OF THE INVENTION

According to the present invention, a moil at the rim of a container produced by shuttle blow molding is controllably removed from the container by providing the neck mold with a moil retaining tool element against an anvil that is used to prevent impact damage between the blow pin and the neck mold, and to cut the moil from the container. The moil retaining tool element is annular in configuration, and has a radially inwardly projecting annular flange that projects into the moil and positively retains the moil in position at the rim of the container as the blow pin is removed from the mold equipment, and notwithstanding the tendency of the moil to adhere to the blow pin. Thereafter, before or after the parting of the halves of the molding equipment the takeout tooling that is used to remove the container from the body mold is inserted into the container through the finish and is then extracted, after the opening of the molding equipment thereby removing the container and moil, in unison, from the body mold. Subsequently, the takeout tooling is used to transfer the container and moil to a separate station, at a controlled location and time in the production cycle, at which the moil and the container are separately discharged, and the takeout tooling is returned to the mold equipment to begin a repeat of the foregoing cycle.

Accordingly, it is an object of the present invention to provide an improved apparatus and method for producing thermoplastic containers by extrusion blow molding. More particularly, it is an object of the present invention to provide an apparatus and method of the foregoing type in which the moils produced at the rims of such containers are positively retained in engagement with the rims of the containers during the removal of the blow pin from the molding equipment and are thereafter severed from the containers in a controlled manner.

For a further understanding of the present invention and the objects thereof, attention is directed to the drawing and the following brief description thereof, to the detailed description of the preferred embodiment and to the appended claims.

BRIEF DESCRIPTION OF THE DRAWING

FIG. 4 is a view like FIGS. 1 and 2 showing a step in the practice of the method according to the present invention that occurs after the step shown in FIG. 3;

FIG. 5 is an exploded, partly fragmentary view that shows a step in the practice of the method according to the present invention that occurs after the step shown in FIG. 4.

DETAILED DESCRIPTION OF THE PREFERRED EMBODIMENT

Figure 1:
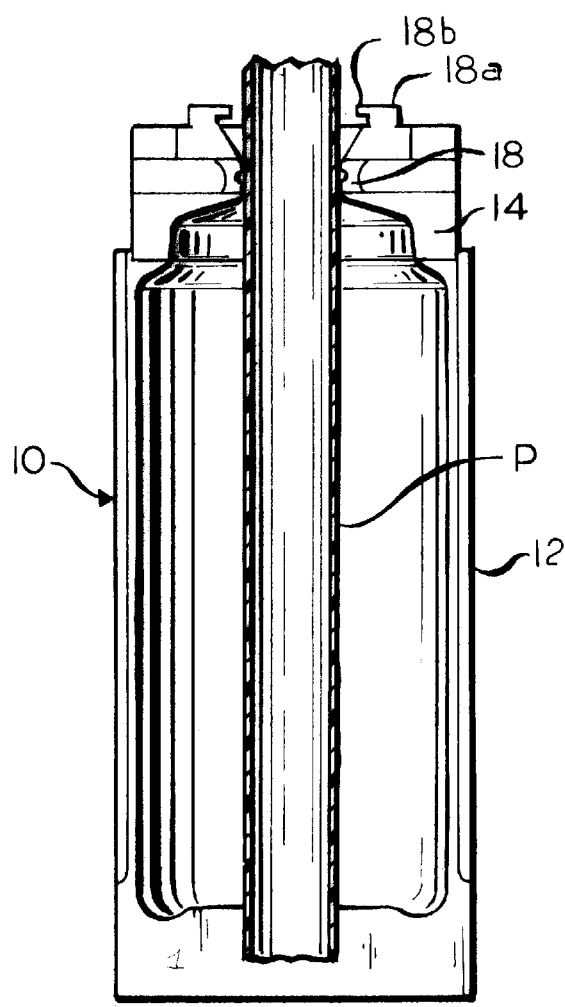
FIG. 1 is a elevational view, partly in cross-section, illustrating equipment according to the preferred embodiment of the present invention for practicing the method according to the preferred embodiment of the present invention at an early step in the practice of the method.

Extrusion blow molding apparatus according to the preferred embodiment of the present invention is identified generally be reference numeral 10, and includes a body mold 12 in which a body portion B of a container C is formed by blowing from an extruded annular parison P of a suitable thermoplastic material at a suitably high temperature for blowing. The body mold 12 is typically formed from an opposed separable pair of mold halves that engage each other in end to end manner along surfaces that extend parallel to a longitudinal central axis of the container C. Only one of such mold halves is illustrated in the drawing.

Figure 2:
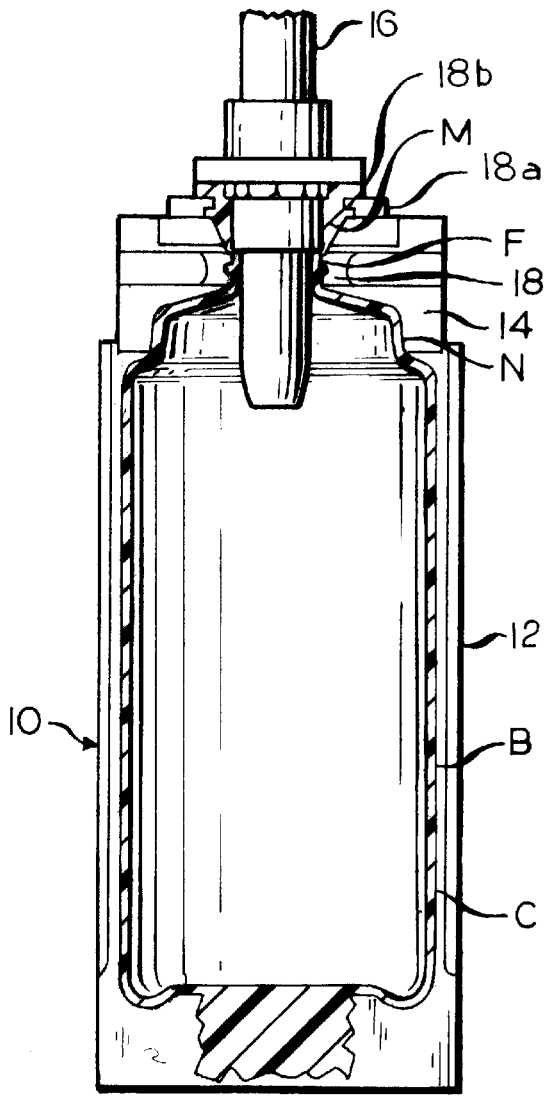
FIG. 2 is a view similar to FIG. 1 showing a later step in the practice of the method according to the present invention.
Figure 3:
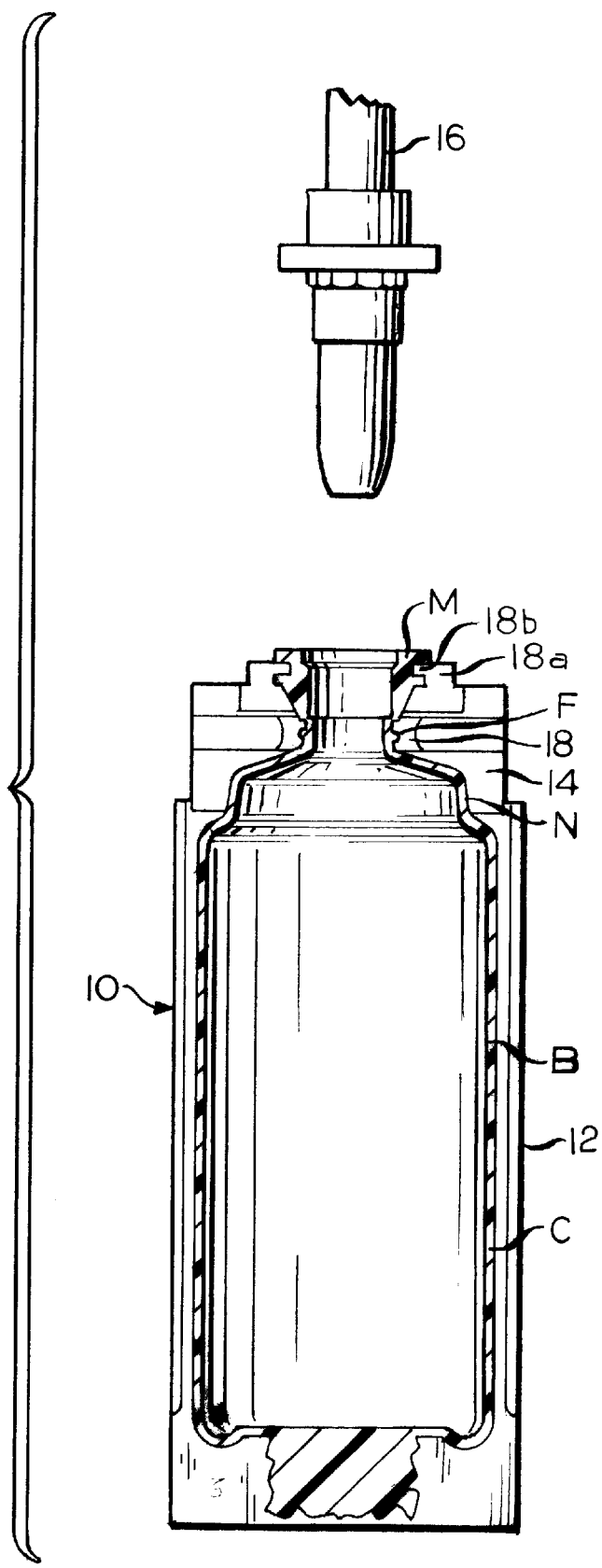
FIG. 3 is an exploded view, but otherwise similar to FIGS. 1 and 2, showing a step in the practice of the method of the present invention that occurs after the step shown in FIG. 2.

A neck portion N of the container C is formed in an annular neck mold 14, which is also formed from an opposed pair separable of mold elements, is removable from the body mold 12 when and if desired to produce a container C with a differently configured neck N. As shown in FIGS. 1–3 the neck mold 14 is positioned in engagement with an upper, open end of the body mold 12 during the molding of the container C, and is opened and closed with the body mold 12 during the production of a multiplicity of like containers C. Only one of such mold halves is illustrated in the drawing. A neck portion N of the container C is formed in an annular neck mold 14 of the molding apparatus 10, and the neck mold 14, which is also formed from an opposed pair separable of mold elements, is removable from the body mold 12 when and if desired to produce a container C with a differently configured neck N. As shown in FIGS. 1–4, the neck mold 14 is positioned in engagement with an upper, open end of the body mold 12 during the molding of the container C, and is opened and closed with the body mold 12 during the production of a multiplicity of like containers C.

As can be seen from a comparison of FIGS. 1 and 2, the parison P is blown into the container C by introducing blowing air through a blow pin 16 that is advanced relative to the molding apparatus 10 during the blowing cycle and is then extracted from the molding apparatus 10 at the conclusion of the blowing cycle. The blow pin 16 has an outside diameter against which an upper finish portion F of the neck N of the container C is formed, and it is this characteristic of extrusion blow molding or shuttle blow molding that results in the manufacture of a container C with a very precisely defined or calibrated finish portion F. In any case, the repeated reciprocation of the blow pin 16 relative to the molding apparatus 10 during the sequential production of a multitude of containers C in the molding apparatus 10, would otherwise cause impact damage to the neck mold 14, but this is prevented by positioning an hardened annular anvil 18 against the exterior of the neck mold 14, in a cavity of the neck mold 14, to absorb the impact loads imposed by the striking of the neck mold 14 by the blow pin 16 during the repeated reciprocation of the blow pin 16.

Figure 6:
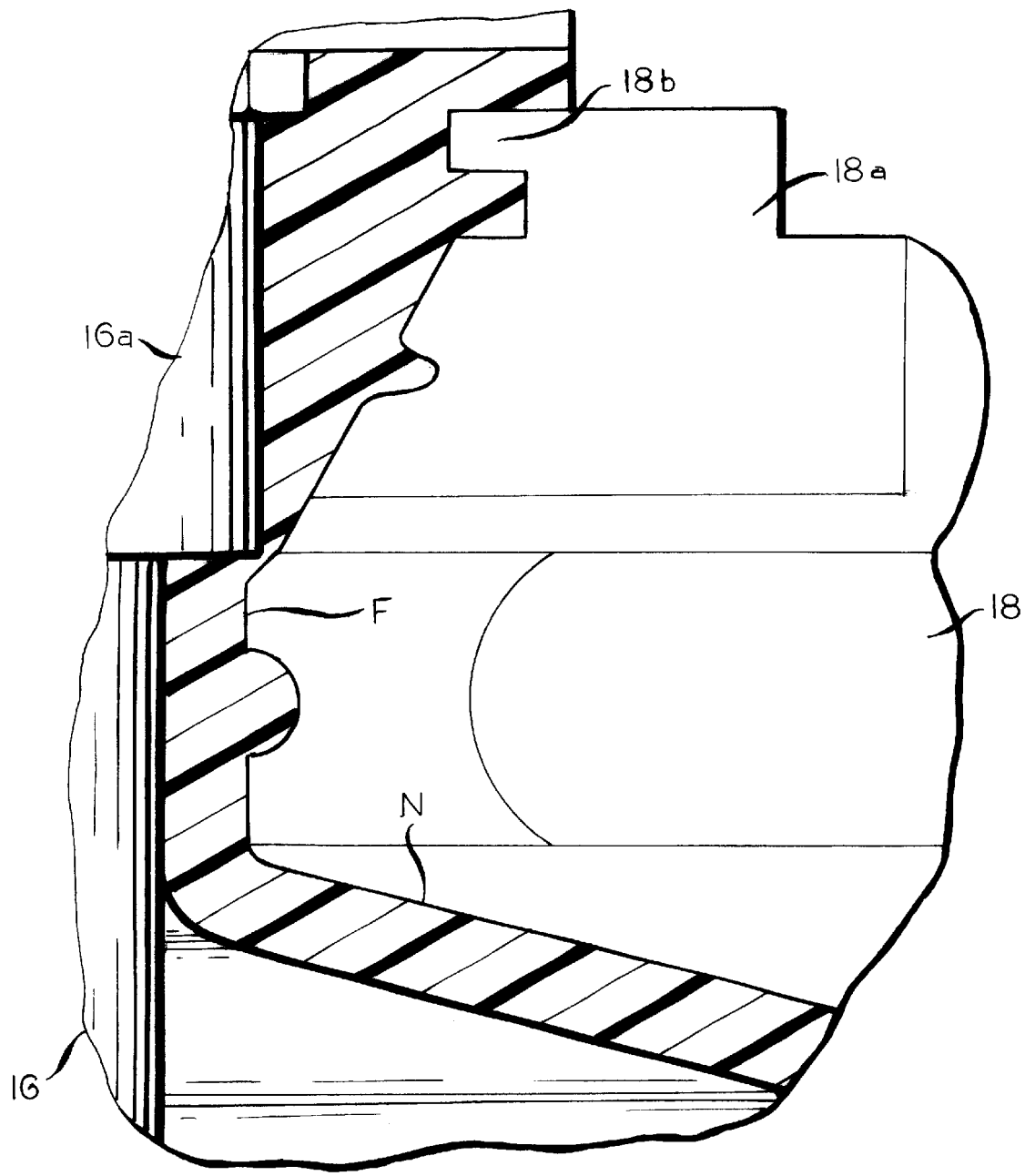
FIG. 6 is a fragmentary sectional view, at an enlarged scale showing the step that is shown in FIG. 2.

During the manufacturing of a container C in the molding apparatus 10, a moil portion M will be formed extending upwardly and outwardly from a rim R at the top of the finish F of the container C, which is specifically illustrated in FIG. 6. The moil M must eventually be removed from the container C, but it is important that the removal be done in a controlled manner and at a precisely determined point in the cycle of producing a container C in the molding apparatus 10. To begin with, the removal of the moil M begins with its severing from the finish M by trapping the moil M between an edge of an enlarged cutter portion 16 of the blow pin 16 in a thin annular pattern against a frustoconical surface of the anvil 18. Upon the removal of the blow pin 16, therefore, the moil 10 would otherwise tend to leave the container C upon the extraction of the blow pin 16 from the molding apparatus 10, because of its engagement with an external diameter of the blow pin 16, as shown in FIG. 2, and the elevated temperature of the moil M at which it will have adhesive properties. However, to prevent the moil M from being withdrawn with the blow pin 16, the anvil 18 is provided with an annular moil retention portion 18a with a radially inwardly projecting flange 18b. The moil retention portion 18a is made integrally with the anvil 18 and is positioned to. have the flange 18b extend into the moil M during the step that is shown in FIGS. 2 and 6. Thus, when the blow pin 16 is extracted, as shown in FIG. 3, the moil M remains with the container C.

At the completion of the molding of the container C in the molding apparatus 10 and the removal of the blow pin 16 from the molding apparatus 10, a takeout tool 20 is inserted into the container C to remove the container C from the molding apparatus 10. After opening of the halves of the molding equipment 10, including the body mold 12 and the neck mold 14, the takeout tool 20 expands radially after insertion into the container C to positively engage the container C and the moil M. The moil M is then severed from the container C and remains with the takeout tool 20, as shown in FIG. 5, until it is positively detached from the takeout tool 20, at a location and time in the production cycle that are carefully controlled, whereupon the moil M is collected with other scrap produced in the process for recycling.

Although the best mode contemplated by the inventor for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

What is claimed is:

1. Apparatus for manufacturing a container from a blowable thermoplastic material, said apparatus comprising:

a body mold made up of an opposed pair of separable mold halves for receiving a first portion of a blowable preform of the blowable thermoplastic material to permit a body portion of the container to be blown from said first portion;

a neck mold made up of an opposed pair of separable mold halves removably positioned against an open end of the body mold for receiving a second portion of the blowable preform of the blowable thermoplastic material to permit a neck portion of the container to be formed therein integrally with the body portion of the container;

a blow pin for introducing blowing air into the first portion of the blowable preform to blow the body portion of the container, said blow pin being reciprocable relative to said body mold to be removable therefrom and continuously engaging an inner annular surface of the neck portion of the container while blowing air is being introduced into the first portion of the blowable preform;

means for engaging an annular moil portion of the blowable thermoplastic material that is formed at a free end of the neck portion of the containers to prevent the moil portion from being removed from the portion as the blow pin is being extracted relative to the body mold after completion of the blow of the body portion; and a takeout tool for insertion into the neck portion of said container after removal of said blow pin from said body mold, said takeout tool engaging said container, including said annular moil, to remove said container with said annular moil in unison from said body mold.

2. Apparaitus according to claim 1 wherein said means for engaging an annular moil portion comprises:

an annular member; and a first flange projecting radially inwardly from said annular member.

3. The method of molding a container from a blowable thermoplastic material, said method comprising:

providing a body mold for molding a body portion of the container;

providing a neck mold for molding a neck portion of the container;

inserting a tubular parison of a blowable thermoplastic material partly in said body mold and partly in said neck mold;

providing a blow pin for introducing blowing air into the parison to blow a portion of the parison into the body portion of the container when a free end of the blow pin is inserted into the parison, at least a portion of the neck portion of the container being formed against a circumferentially endless portion of an exterior of said blow pin when said blow pin is introducing blowing air into the parison;

providing a moil retention tool positively engaging a moil portion extending from a rim at the neck portion of the container while introducing blowing air into the parison;

withdrawing the blow pin from the position it occupies during blowing and while the moil retention tool positively retains the moil portion as a part of the container; and separating the moil from the neck portion of the container by engagement of the moil by a portion of the blow pin while the blow pin is positioned to introduce blowing air into the parison.

\* \* \* \* \*